US006980221B2

(12) United States Patent
Spaulding et al.

(10) Patent No.: US 6,980,221 B2
(45) Date of Patent: Dec. 27, 2005

(54) METHOD FOR REPRESENTING A DIGITAL COLOR IMAGE USING A SET OF PALETTE COLORS

(75) Inventors: Kevin E. Spaulding, Spencerport, NY (US); Qing Yu, Rochester, NY (US); Jiebo Luo, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 129 days.

(21) Appl. No.: 09/900,565

(22) Filed: Jul. 6, 2001

(65) Prior Publication Data

US 2003/0011607 A1    Jan. 16, 2003

(51) Int. Cl.[7] ............................. G09G 5/02; G09G 5/00
(52) U.S. Cl. ...................................... 345/601; 345/589
(58) Field of Search ................................ 345/590, 597, 345/600, 581, 635, 603, 593, 601, 589, 602, 345/605; 382/166

(56) References Cited

U.S. PATENT DOCUMENTS

| | | | | |
|---|---|---|---|---|
| 5,144,688 A * | 9/1992 | Bovir et al. | ................. | 382/166 |
| 5,175,807 A * | 12/1992 | Cawley et al. | ............... | 345/428 |
| 5,282,255 A * | 1/1994 | Bovik et al. | ................. | 382/239 |
| 5,432,893 A * | 7/1995 | Blasubramanian et al. | . | 345/600 |
| 5,459,486 A * | 10/1995 | Iverson et al. | ............... | 345/593 |
| 5,500,921 A * | 3/1996 | Ruetz | .......................... | 358/1.9 |
| 5,544,284 A | 8/1996 | Allebach et al. | | |
| 5,585,944 A * | 12/1996 | Rodriguez | ................... | 358/500 |
| 5,588,069 A * | 12/1996 | Katayama et al. | .......... | 382/166 |
| 5,608,426 A * | 3/1997 | Hester | ........................ | 345/600 |
| 5,745,103 A * | 4/1998 | Smith | ......................... | 345/601 |
| 5,847,692 A * | 12/1998 | Ono | ............................ | 345/601 |
| 6,011,540 A * | 1/2000 | Berlin et al. | ................ | 345/601 |
| 6,108,008 A * | 8/2000 | Ohta | ........................... | 345/590 |
| 6,229,523 B1 * | 5/2001 | Czako | ........................ | 345/601 |
| 6,253,220 B1 * | 6/2001 | Le Beux et al. | ............ | 715/530 |
| 6,313,850 B1 * | 11/2001 | Czako | ........................ | 345/686 |
| 6,331,860 B1 * | 12/2001 | Knox | .......................... | 345/620 |
| 6,385,336 B1 * | 5/2002 | Jin | ............................. | 382/162 |
| 6,385,337 B1 * | 5/2002 | Klassen | ...................... | 382/166 |
| 6,388,675 B1 * | 5/2002 | Kamada et al. | ............. | 345/600 |
| 6,518,981 B2 * | 2/2003 | Zhao et al. | .................. | 715/764 |
| 6,532,020 B1 * | 3/2003 | Friedman et al. | ........... | 345/601 |
| 6,625,306 B1 * | 9/2003 | Marshall et al. | ............ | 382/162 |
| 6,678,407 B1 * | 1/2004 | Tajima | ....................... | 382/167 |
| 6,801,214 B1 * | 10/2004 | Moriwaki et al. | .......... | 345/600 |
| 2002/0163530 A1 * | 11/2002 | Takakura et al. | ........... | 345/629 |

OTHER PUBLICATIONS

"A new vector quantization clustering algorithm", Equitz, IEEE Transactions on acoustics, speech, and signal processing, vol. 37, No. 10, Oct. 1989.*

"A New Approach to Palette Selectio for Color Images" by R. Balasubramanian et al., Journal of Imaging Technology, vol. 17, No. 6, Dec. 1991, pp. 284-290.

(Continued)

Primary Examiner—Ryan Yang
(74) Attorney, Agent, or Firm—Raymond L. Owens

(57) ABSTRACT

Disclosed is a method for converting an input digital color image having a set of possible input colors to an output digital color image having a set of palette colors, the number of palette colors being less than the number of possible input colors, wherein the set of palette colors is determined based on the distribution of colors in the input digital image supplemented by a distribution of important colors.

19 Claims, 3 Drawing Sheets

OTHER PUBLICATIONS

"Quantization of Color Images Based on Uniform Color Spaces" by R. Gentile et al., Society for Imaging Science and Technology, 16, 11-21 (1990).

"Quantization and Multilevel Halftoning of Color Images for Near-Original Image Quality" by Ronald Gentile, J. Opt. Soc. Am. A, 1019-1026 (1990).

* cited by examiner

METHOD FOR REPRESENTING A DIGITAL COLOR IMAGE USING A SET OF PALETTE COLORS

CROSS REFERENCE TO RELATED APPLICATIONS

Reference is made to commonly assigned U.S. patent application Ser. No. 09/900,564 filed Jul. 6, 2001 entitled "Method For Representing s Digital Color Image Using a Set of Palette Colors Based on Detected Important Colors" by Jiebo Luo et al., the disclosure of which is incorporated herein by reference.

FIELD OF THE INVENTION

This invention relates to the field of digital imaging, and more particularly to a method for representing a digital color image using a limited palette of color values.

BACKGROUND OF THE INVENTION

Many color image output devices are not capable of displaying all of the colors in an input digital image due to the fact that they must be stored in a memory buffer with a reduced bit-depth. Likewise, it may also be desirable to represent an image using a reduced bit-depth in order to reduce the amount of bandwidth needed for the transmission of an image, or the amount of memory needed to store an image. For example, many computers may use an 8-bit or a 16-bit color representation to store an image that is to be displayed on a soft-copy display such as a CRT or an LCD screen. Such representations allow only 256 and 65,536 unique color values, respectively. This is significantly less than the 16,777,216 possible color values associated with a typical 24-bit color image that is conventionally used in many digital imaging applications.

In applications where it is necessary to represent an input image using a reduced number of colors, it is necessary to determine the set of colors to be included in the reduced set of colors. In some cases, a reduced set of colors may be determined ahead of time independent of the particular image being encoded. For example, 3-bits of color information (8 different levels) may be used for the red and green channels of an image, and 2-bits of color information (4 different levels) may be used for the blue channel of an image. This produces a lattice of 8×8×4=256 different color values that can be used to represent the input image using an 8-bit representation. The input digital image can be converted to the 8-bit representation simply by taking the highest 2- or 3-bits of each of the corresponding RGB channels. The result is an image which has quantization errors that can produce visible contours in the image in many circumstances. One disadvantage of this method is that any particular image may not contain colors in all parts of color space. As a result, there may be some of the 256 color values that never get used. Consequently, the quantization errors are larger than they would need to be.

One method for minimizing the visibility of the quantization errors in the reduced bit-depth image is to use a multi-level halftoning algorithm to preserve the local mean of the color value. (For example see: R. S. Gentile, E. Walowit and J. P. Allebach, "Quantization and multilevel halftoning of color images for near original image quality," J. Opt. Soc. Am. A 7, 1019–1026 (1990).)

Another method for minimizing the visibility of the quantization errors in the reduced bit-depth image is to select the palette of color values used to represent each image based on the distribution of color values in the actual image. This avoids the problem of wasting color values that will never be used to represent that particular image. Examples of such image dependent palette selection methods include vector quantization schemes, such as those described in R. S. Gentile, J. P. Allebach and E. Walowit, "Quantization of color images based on uniform color spaces," J. Imaging Technol. 16, 11–21 (1990). These methods typically involve the selection of an initial color palette, followed by an iterative refinement scheme. Another approach, described in R. Balasubramanian and J. P. Allebach, "A new approach to palette selection for color images," J. Imaging Technol. 17, 284–290 (1991), starts with all of the colors of an image and groups colors into clusters by merging one nearest neighbor pair of clusters at a time until the number of clusters equals the desired number of palette colors. A third class of vector quantization algorithms uses splitting techniques to divide the color space into smaller sub-regions and selects a representative palette color from each sub-region. In general, splitting techniques are computationally more efficient than either the iterative or merging techniques and can provide a structure to the color space that enables efficient pixel mapping at the output. (For a description of several such splitting techniques, see commonly assigned U.S. Pat. No. 5,544,284.)

While vector quantization mechanisms can yield high quality images, they are very computationally intensive. A sequential scalar quantization method is set forth by Allebach et al. in U.S. Pat. No. 5,544,284. This method sequentially partitions a histogram representing the distribution of the original digital color image values into a plurality of sub-regions or color space cells, such that each partitioned color cell is associated with a color in the output color palette. This method has the advantage that it is generally more computationally efficient than vector quantization schemes.

Image dependent palette selection methods have the significant advantage that they assign the palette colors based on the distribution of color values in a particular digital image. Therefore, they avoid the problem of having palette color values that never get used for a particular image. The various methods will generally tend to select palette colors that are representative of the most commonly occurring colors in the particular image. This has the result of reducing the average quantization errors throughout the image. However, in some cases, there may still be large quantization errors in important image regions. For example, consider the case where an image contains the face of a person that only occupies a small image region. The number of pixels in the image that represent skin-tone colors may be relatively small, and therefore the likelihood that palette colors get assigned to skin-tone colors will be low. As a result, when the image is represented by the set of chosen palette colors, there may be objectionable contours in the face. Since this image region may be very important to an observer, these artifacts may be much more objectionable than they would have been if they had occurred in other image regions. Other types of image content where quantization artifacts may be particularly objectionable would include neutral image regions, and blue sky image regions. Existing image dependent palette selection techniques do not provide any mechanism for minimizing the quantization artifacts in these important image regions unless they are large enough in size to comprise a significant portion of the distribution of image colors.

SUMMARY OF THE INVENTION

It is an object of the present invention to provide an improved method for palette selection which minimizes quanitization artifacts for selected important colors.

This object is achieved by a method for converting an input digital color image having a set of possible input colors to an output digital color image having a set of palette colors, the number of palette colors being less than the number of possible input colors, wherein the set of palette colors is determined based on the distribution of colors in the input digital image supplemented by a distribution of important colors. This is accomplished using the steps of determining the distribution of colors in the input digital color image, supplementing the distribution of colors by a distribution of important colors, determining the set of palette colors to be used in the formation of the output digital color image responsive to the supplemented distribution of colors, and forming the output digital color image by assigning each color in the input digital color image to one of the colors in the set of palette colors.

ADVANTAGES

The present invention has the advantage that the set of palette colors that are determined will emphasize important colors whether or not the important colors occupy a large area of the input image. The present method provides more esthetically pleasing images to a viewer.

It has the further advantage that any conventional image-dependent palettization algorithm, such as sequential scalar quantization or vector quantization, can be used in accordance with the present invention by simply appending additional pixels to the input image, where the color of the additional pixels is distributed according to the distribution of important colors.

DETAILED DESCRIPTION OF THE INVENTION

Figure 1:
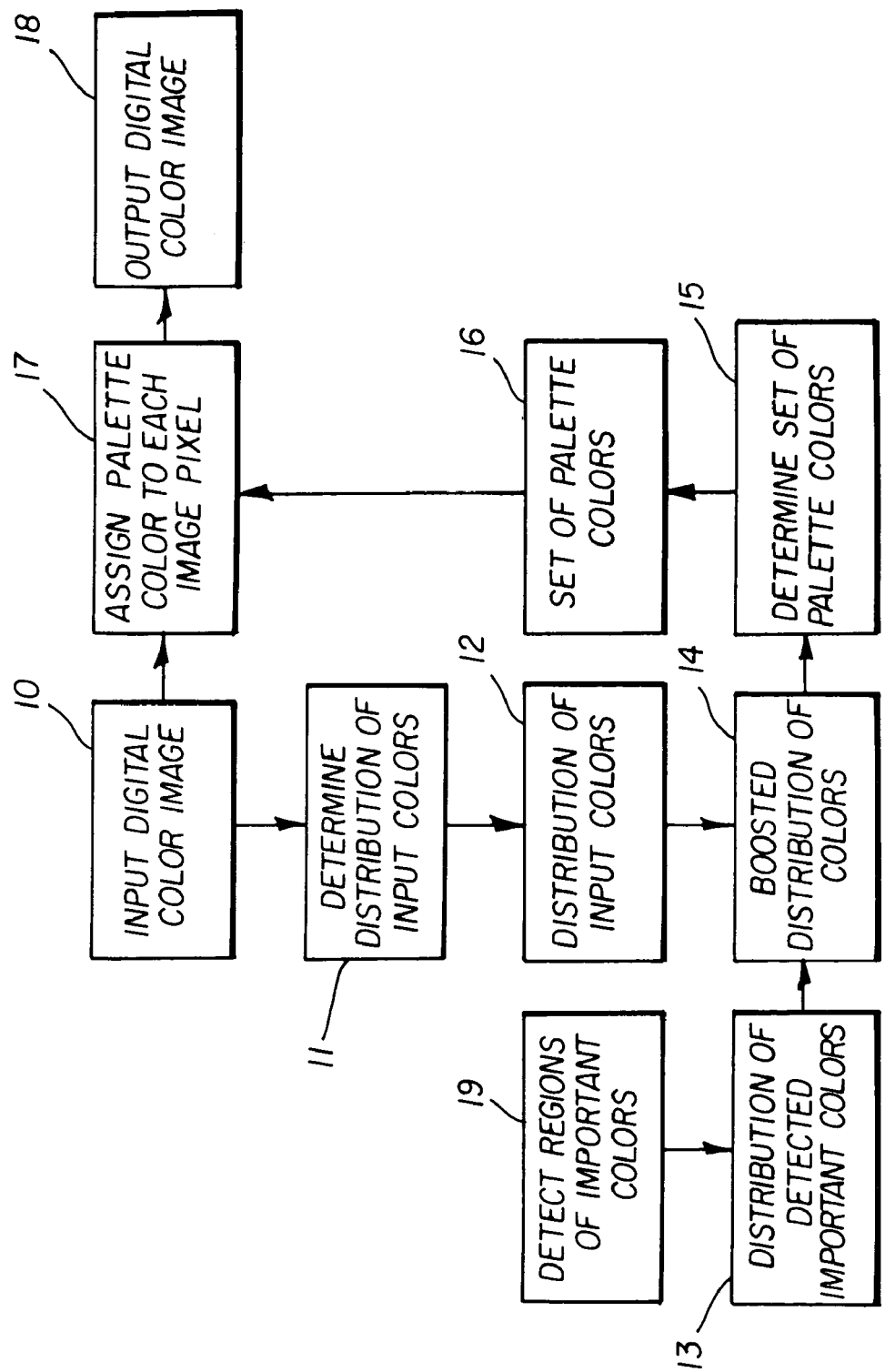
FIG. 1 is a flow diagram illustrating the method of the present invention.

A flow diagram illustrating the basic method of the present invention is shown in FIG. 1. The method operates on an input digital color image 10 having a set of possible input colors. The set of possible input colors will be defined by the color encoding of the input digital color image 10. Typically, the input digital color image 10 might be a 24-bit RGB color image having $2^{24}$=16,777,216 different colors. However, it will be recognized that the invention is not limited to this configuration. Alternatively, the input digital color image 10 could be at some other bit-depth, or could be in some other color space such as $YC_RC_B$ or CIELAB. A determine distribution of input colors step 11 is used to determine the distribution of input colors 12. In a preferred embodiment of the present invention, the distribution of the input colors is determined by forming a three-dimensional histogram of color values.

Next, the distribution of input colors 12 is supplemented by a distribution of important colors 13 to form a supplemented distribution of colors 14. A determine set of palette colors step 15 is then used to determine a set of palette colors 16 responsive to the supplemented distribution of colors 14. Since the supplemented distribution of colors 14 has been supplemented by the distribution of important colors 13, the set of palette colors will contain more colors in and/or near the important color regions than would otherwise be the case if the determine set of palette colors step 15 had been applied to the original distribution of input colors 12. The number of colors in the set of palette colors 16 will be less than the number of possible input colors. In a preferred embodiment of the present invention, the number of palette colors will be 256 corresponding to the number of different colors that can be represented with an 8-bit color image. However, it will be obvious to one skilled in the art that the method can be generalized to any number of palette colors. For example, if the output image were a 4-bit color image, the number of corresponding output colors would be 16, or if the output image were a 10-bit color image, the number of corresponding palette colors would be 1024.

Once the set of palette colors 16 has been determined, an assign palette color to each image pixel step 17 is used to form an output digital color image 18. The output digital color image 18 will be comprised entirely of colors chosen from the set of palette colors. Generally, the palette color for each pixel of the image will be identified by an index value indicating which palette color should be used for that pixel. For example, if there are 256 palette colors used for a particular image, each pixel of the output image can be represented by an 8-bit number in the range 0–255. The output digital color image 18 will generally be stored in a digital memory buffer, or in a digital image file. In order to properly display the image, a palette index indicating the color value for each of the different palette colors needs to be associated with the image. When the image is displayed, the palette index can be used to determine the corresponding color value for each of the palette colors.

The steps in the method of FIG. 1 will now be discussed in more detail. The determine distribution of input colors step 11 can take many forms. In a preferred embodiment of the present invention, a three-dimensional histogram of the input colors of the input digital color image is computed. One way that the histogram of input color values can be computed is to go through each pixel of the input image and count the number of occurrences of each input color. To limit the number of bins in the histogram of input colors, ranges of input color values can be grouped into a single bin. For example, instead of 256 different bins for the red dimension, a smaller number of bins such as 32 or 64 could be used.

Additionally, to speed up the computation of the histogram of input colors, it may be desirable to sub-sample the pixels in the input image. For example, instead of examining every image pixel, only the pixels in every $10^{th}$ row and every $10^{th}$ column could be used to form the histogram of input colors. In some cases, it might be desirable to convert the image to some other color space before determining the histogram of input colors. For example, an RGB image could be converted to a $YC_RC_B$ luminance-chrominance representation. This is advantageous for some types of palette determination algorithms. This also makes it possible to use different bin sizes for the luminance and chrominance color channels.

There are many examples of sets of important colors that could be used with the method of the present invention. Generally, the important colors should be chosen or selected to be colors that are of high importance to a human observer. Colors that are likely to appear in smoothly varying image regions are particularly critical since they will be most likely to suffer from image quality degradations resulting from quantization errors. Skin-tone colors are an example of colors that might be included in the set of important colors. Not only are skin-tone colors very important to image quality as judged by a human observer, but additionally, they usually occur as slowly varying gradients in an image. There are many different variations of skin-tone colors corresponding to different races and complexions, as well as to variations in the illumination characteristics of the scene. In this case, the distribution of important colors should generally reflect the expected variations in the skin-tone colors. The distribution of skin-tone colors can be determined by measuring color values for a wide variety of races, complexions and illuminations, and creating a histogram, or finding some set of statistical parameters describing the shape of the color distribution. Alternatively, a vector quantization algorithm, such as the well-known "k-means" algorithm could be used to cluster the measured skin-tone color values into a smaller set of representative color values.

Other colors that might be included in the distribution of important colors for some applications would be neutral colors and sky colors. In many applications, quantization errors in these regions might be particularly visible and/or objectionable.

There are several methods that could be used to determine the supplemented distribution of colors 14. For example, a histogram of important colors could be pre-computed and then combined with the histogram determined to represent the distribution of input colors. In this case, the supplemented distribution of colors 14 could be determined by simply adding the histogram of important colors to the histogram of input colors to form a supplemented histogram. Alternatively, a weighted combination of the histogram of important colors and the histogram of input colors could be used to adjust the relative weight assigned to the two histograms.

Another approach for determining the supplemented distribution of colors 14 is to append additional pixels to the input digital color image to form an enlarged input digital color image. The colors of the additional pixels that are appended to the image are distributed according to the distribution of important colors. The supplemented distribution of colors can then be determined by simply determining the distribution of colors in the enlarged input digital color image. The additional pixels can be provided in the form of a predetermined target image that can be appended to the image. Generally, it may be desirable to resize the target image before appending it to the input digital color image. For example, it will typically be more convenient to combine the two images if the width of the target image is adjusted to match the width of the input digital color image.

Figure 2:
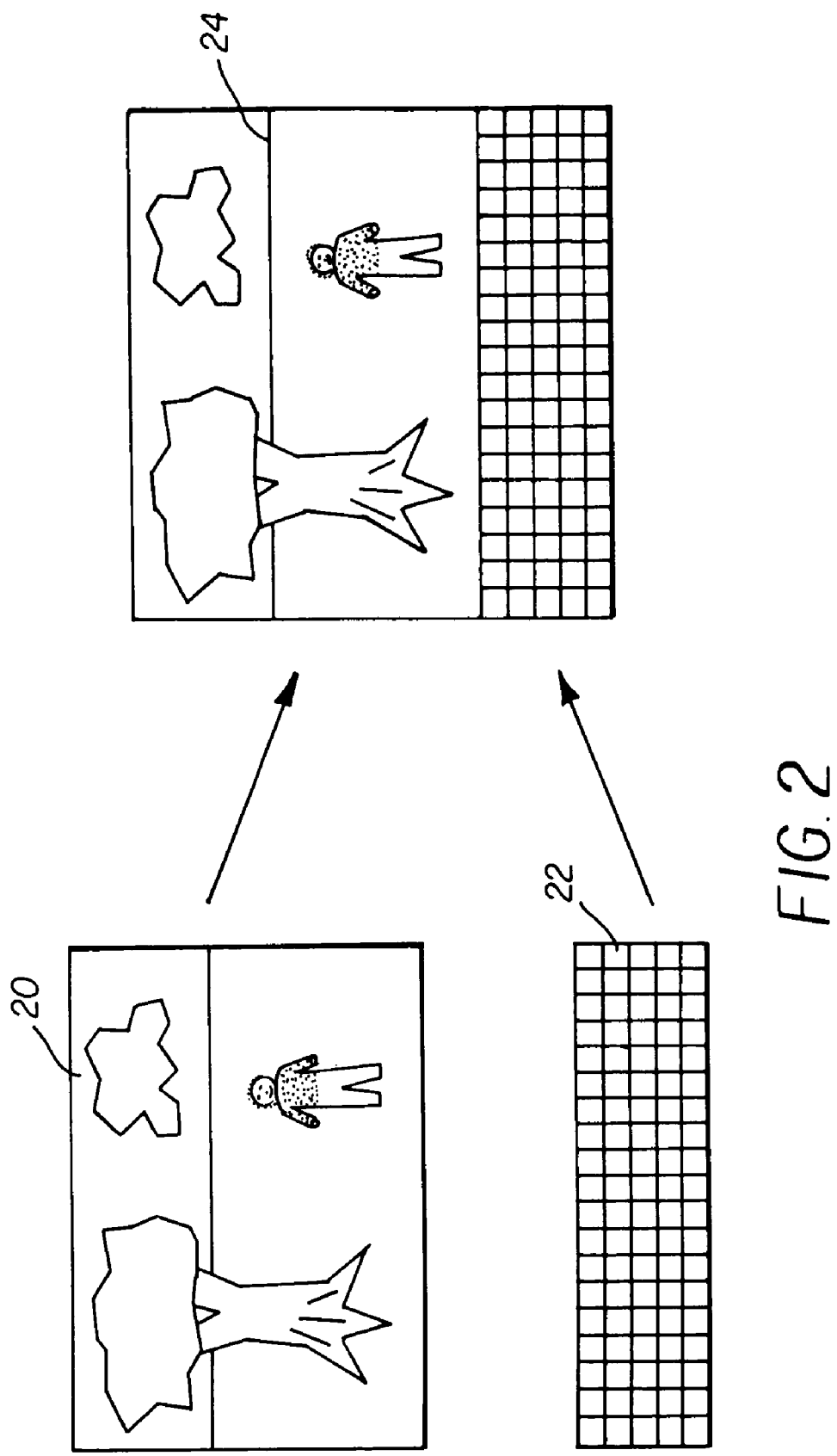
FIG. 2 is a diagram showing the process of appending additional pixels to the input digital color image.

This method is illustrated in FIG. 2. An input image 20 is shown which includes a person occupying a relatively small region of the image. A conventional palettization method would assign very little weight to the skin-tone colors since they make up a statistically small portion of the image. However, the colors in the input image are supplemented by appending additional pixels 22 to the image to form an enlarged image 24. The colors of these additional pixels correspond to the distribution of important colors. For example, if the important colors were specified to be skin-tone colors, the additional pixels could include a wide variety of skin-tone colors corresponding to different races, complexions and illuminations of typical skin-tones. The additional pixels could be discrete patches of different skin-tones, or could include smooth gradients covering the range of expected skin-tone colors. The supplemented distribution of colors 14 can then be computed directly from the enlarged image 24, rather than having to combine the distribution of input colors 12 and a separate distribution of important colors 13. When the set of palette colors 16 is determined based on this supplemented distribution of colors 14, more palette colors will be assigned in the skin-tone region of color space, and therefore the quantization artifacts for these important colors will be reduced.

The advantage of appending additional pixels to the image for the purpose of computing the supplemented distribution of colors 14 rather than simply combining the histogram of important colors and the histogram of input colors is that this method can be implemented without needing to modify the algorithm that is used to determine the set of palette colors. For example, if the algorithm were only available as a compiled executable software module, then it would be possible to practice the method of the present invention by simply including a pre-processing step of appending the additional image pixels to the input image before running the software module, and a post-processing step to strip the additional pixels off of the processed output image created by the software module.

There are many different methods that could be used for the determine set of palette colors step 15. In a preferred embodiment of the present invention, a sequential scalar quantization technique such as that described by Allebach et al. in U.S. Pat. No. 5,544,284 is used. This approach works by sequentially partitioning the colors of the supplemented distribution of colors 14 into a set of color space regions. This is generally done on a luminance-chrominance representation of the image. The set of palette colors 16 is then determined by selecting an output color for each color space region in the set of color space regions. For more details of this method, reference should be made to the above-mentioned U.S. Pat. No. 5,544,284.

Other methods that could be used for the determine set of palette colors step 15 include a wide variety of vector quantization techniques. Several examples of these methods are discussed in U.S. Pat. No. 5,544,284. It will be obvious to one skilled in the art that the method of the present invention can easily be used with any image palettization technique where the selected palette colors are dependent on the distribution of colors in the input image.

Once the set of palette colors 16 is determined, the assign palette color to each image pixel step 17 is used to form an output digital color image 18. One manner in which this step can be implemented is to determine the palette color having the smallest color difference relative to the color of each pixel of the input digital color image.

In some cases, a particular input digital color image 10 might not contain any of the colors in the distribution of important colors 13. As a result, the method of the present invention would result in assigning palette colors that would never get used in output digital color image.18. In a variation of the present invention, a test can be first applied to the input digital color image 10 to determine if it contains any colors in the distribution of important colors 13. If there are no such colors, then the step of forming the supplemented distribution of colors 14 can be skipped, and the set of palette colors can be determined directly from the distribution of input colors 12. One convenient means for determining whether the input digital color image 10 contains any colors in the distribution of important colors 13 is to examine the distribution of input colors 12. For example, if a three-dimensional histogram were used to represent the distribution of input colors 12, then it would simply be necessary to examine the histogram cell(s) corresponding to the colors in the distribution of important colors. If these histogram cell(s) were all found to contain zeros, then it can be concluded that the input digital color image 10 does not contain any colors in the distribution of important colors 13. If there are multiple subsets of important colors in the distribution of important colors 13 (for example skin-tones and neutrals), then only the subset(s) of important colors that are present in the distribution of input colors 11 need to be used to form the supplemented distribution of colors 14. In this case, the distribution of important colors is only used to supplement the distribution of colors in the input digital color image in important color regions where the input digital color image contains a significant number of pixels.

Figure 3:
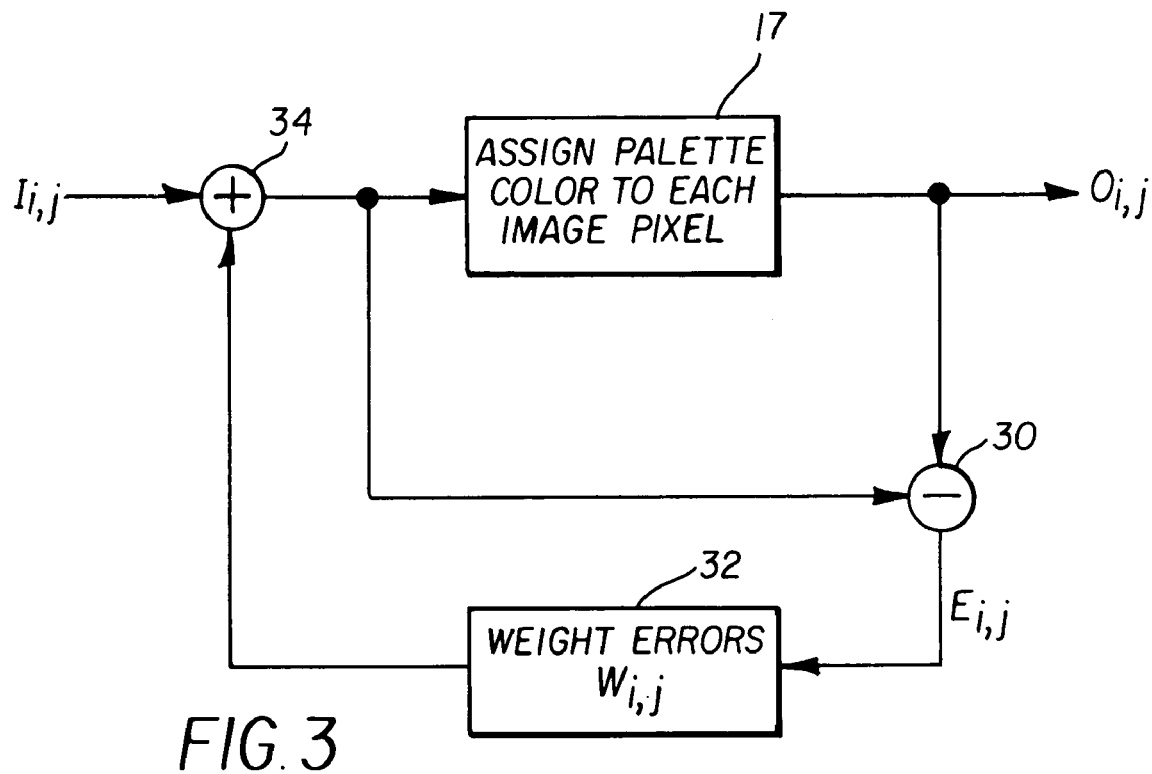
FIG. 3 is a diagram showing a multi-level vector error diffusion algorithm.
Figure 4:
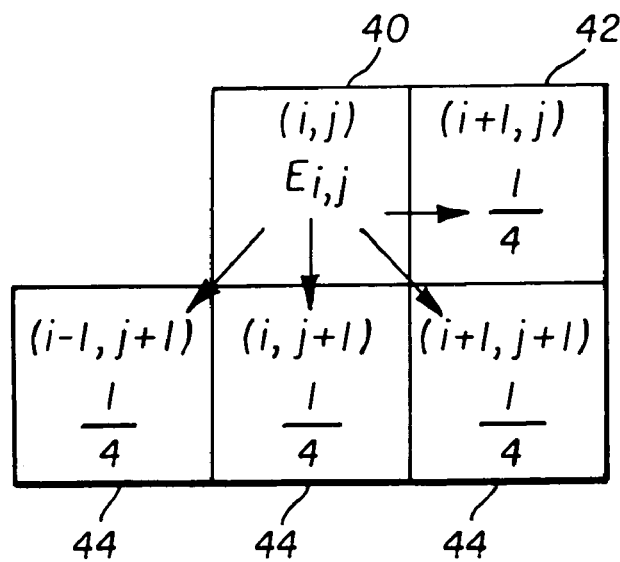
FIG. 4 shows an example set of error weights that can be used for a multi-level vector error diffusion algorithm.

In a variation of the present invention, the assign palette color to each image pixel step 17 includes the application of a multi-level halftoning algorithm. Multi-level halftoning algorithms can be used to create the appearance of color values intermediate to the palette colors by varying the palette values assigned to the pixels of the output digital color image 18 such that the local mean color value is approximately preserved. An example of a multi-level halftoning method that could be used would be multi-level vector error diffusion. A flow diagram illustrating a typical multi-level vector error diffusion algorithm is shown in FIG. 3. In this figure, an input pixel color value $I_{i,j}$ from the $i^{th}$ column and $j^{th}$ row of the input digital color image 10 is processed by an assign palette color to each image pixel step 17 to form a corresponding output pixel color value $O_{i,j}$ of the output digital color image 18. The assign palette color to each image pixel step 17 introduces a quantization error due to the fact that the output pixel value is selected to be one of the palette colors in the determined set of palette colors 16. A difference operation 30 is used to compute a color error $E_{i,j}$ representing the vector difference between the input pixel color value $I_{i,j}$ and the output pixel color value $O_{i,j}$. A weight errors step 32 is used to apply a series of error weights $W_{i,j}$ to the resulting color error $E_{i,j}$. A sum operation 34 is then used to add the weighted color errors to nearby input pixels that have yet to be processed. An example set of error weights $W_{i,j}$ is shown in FIG. 4. In this example, the color error $E_{i,j}$ for the current pixel 40 with column and row address (i,j) is weighted by a factor of ¼ and distributed to the next pixel to the right 42 in the current row of the image having the column and row address (i+1, j). Likewise the color error $E_{i,j}$ is also weighted by factors of ¼ and distributed to three pixels in the next row of the image 44 having column and row addresses (i−1, j+1), (i, j+1) and (i+1, j+1). In this way, the quantization errors introduced when processing the current pixel 40 are distributed to nearby input pixels that have not yet been processed. The result is that the local mean color value is approximately preserved.

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

| PARTS LIST | |
|---|---|
| 10 | input digital color image |
| 11 | determine distribution of input colors step |
| 12 | distribution of input colors |
| 13 | distribution of important colors |
| 14 | supplemented distribution of colors |
| 15 | determine set of palette colors step |
| 16 | set of palette colors |
| 17 | assign palette color to each image pixel step |
| 18 | output digital color image |
| 20 | input image |
| 22 | additional pixels |
| 24 | enlarged image |
| 30 | difference operation |
| 32 | weight errors step |
| 34 | sum operation |
| 40 | current pixel |
| 42 | next pixel to the right |
| 44 | pixels in next row of image |

What is claimed is:

1. A method for converting an input digital color image having a set of possible input colors to an output digital color image having a set of palette colors, the number of palette colors being less than the number of possible input colors, wherein the set of palette colors is determined based on the distribution of colors in the input digital image supplemented by a distribution of pre-defined important colors, comprising:
   a) determining a distribution of input colors from pixels in the input digital color image;
   b) providing the distribution of pre-defined important colors;
   c) combining the distribution of input colors with the distribution of pre-defined important colors to produce a supplemented distribution of colors that includes a greater emphasis on the important colors than does the distribution of input colors;
   d) determining a set of palette colors to be used in the formation of an output digital color image from the supplemented distribution of colors; and
   e) forming the output digital color image by assigning each color in the input digital color image to one of the colors in the set of palette colors.

2. The method of claim 1, wherein the distribution of pre-defined important colors includes a distribution of skin-tone colors.

3. The method of claim 1, wherein the distribution of pre-defined important colors includes a distribution of neutral colors.

4. The method of claim 1, wherein the distribution of pre-defined important colors includes a distribution of sky colors.

5. The method of claim 1, wherein determining the supplemented distribution of colors is accomplished by appending additional pixels to the input digital color image to form an enlarged input digital color image, where the color of the additional pixels is distributed according to the distribution of pre-defined important colors, and then determining the distribution of colors in the enlarged input digital color image.

6. The method of claim 1, wherein the set of palette colors is determined using a sequential scalar quantization algorithm.

7. The method of claim 6, wherein the sequential scalar quantization algorithm includes:
  i) sequentially partitioning the colors of the supplemented distribution of colors into a set of color space regions; and
  ii) determining the set of palette colors by selecting an output color for each color space region in the set of color space regions.

8. The method of claim 7, further comprising:
  determining the color value for each pixel of the output digital color image by identifying the palette color corresponding to the color space region containing the input color for the corresponding pixel of the input digital color image.

9. The method of claim 1, wherein the set of palette colors is determined using a vector quantization algorithm.

10. The method of claim 1, wherein the output digital color image is formed by assigning each color in the input digital color image to the color in the set of palette colors having the smallest color difference relative to the color of the input digital color image.

11. The method of claim 1, wherein e) includes the use of a multi-level halftoning technique to assign each color in the input digital color image to one of the colors in the set of palette colors in such a way so as to approximately preserve the local mean color value.

12. The method of claim 11, wherein the multi-level halftoning technique is an error diffusion technique that distributes the quantization errors introduced when processing an input pixel to nearby input pixels that have not yet been processed.

13. The method of claim 1, wherein the distribution of pre-defined important colors is only used to supplement the distribution of colors in the input digital color image in color regions where the input digital color image contains a significant number of pixels.

14. The method of claim 1, wherein the distribution of pre-defined important colors comprises a target image of the important colors, the method further comprising:
  collecting additional pixels from the target image; and
  adding the collected additional pixels to the distribution of input colors to produce the supplemented distribution of colors.

15. The method of claim 1, wherein the important colors are colors that are likely to appear in smoothly varying image regions within a digital color image.

16. The computer storage medium of claim 1, wherein the distribution of colors in the input digital color image, the distribution of pre-defined important colors, and the supplemented distribution of colors are histograms.

17. A computer storage medium having instructions stored therein for causing the computer to perform a method for converting an input digital color image having a set of possible input colors to an output digital color image having a set of palette colors, the number of palette colors being less than the number of possible input colors, wherein the set of palette colors is determined based on the distribution of colors in the input digital image supplemented by a distribution of pre-defined important colors including:
  a) determining a distribution of input colors from pixels in the input digital color image;
  b) providing the distribution of pre-defined important colors;
  c) combining the distribution of input colors with the distribution of pre-defined important colors to produce a supplemented distribution of colors that includes a greater emphasis on the important colors than does the distribution of input colors;
  d) determining a set of palette colors to be used in the formation of an output digital color image from the supplemented distribution of colors; and
  e) forming the output digital color image by assigning each color in the input digital color image to one of the colors in the set of palette colors.

18. The method of claim 17, wherein the distribution of pre-defined important colors comprises a target image of the important colors, the method further comprising:
  collecting additional pixels from the target image; and
  adding the collected additional pixels to the distribution of input colors to produce the supplemented distribution of colors.

19. The computer storage medium of claim 17, wherein the distribution of colors in the input digital color image, the distribution of pre-defined important colors, and the supplemented distribution of colors are histograms.

* * * * *

UNITED STATES PATENT AND TRADEMARK OFFICE
CERTIFICATE OF CORRECTION

PATENT NO. : 6,980,221 B2  Page 1 of 1
APPLICATION NO. : 09/900565
DATED : December 27, 2005
INVENTOR(S) : Kevin E. Spaulding et al.

It is certified that error appears in the above-identified patent and that said Letters Patent is hereby corrected as shown below:

Column 9, line 37, Claim 14   Please replace "The method of claim 1" with --The method of claim 17--
Column 10, line 33, Claim 18   Pleaase replace "The method of claim 17" with --The method of claim 1--

Signed and Sealed this

Twenty-eighth Day of November, 2006

JON W. DUDAS
*Director of the United States Patent and Trademark Office*